United States Patent [19]
Adnet et al.

[11] Patent Number: 5,609,745
[45] Date of Patent: Mar. 11, 1997

[54] PROCESS FOR THE ELECTROCHEMICAL OXIDATION OF AM(III) TO AM(VI) USABLE FOR SEPARATING AMERICIUM FROM SPENT NUCLEAR FUEL REPROCESSING SOLUTIONS

[75] Inventors: Jean M. Adnet, Roquemavre; Louis Donnet, Bagnols sur Cèze; Philippe Brossard, Villeneuve des Avignon; Jacques Bourges, Verrières le Buisson, all of France

[73] Assignees: Commissariat A L'Energie Atomique, Paris, France; Compagnie Generale des Matieres Nucleaires, Velizy-Villacoublay, France

[21] Appl. No.: 611,625

[22] Filed: Mar. 6, 1996

[30] Foreign Application Priority Data

Mar. 15, 1995 [FR] France ................................. 95 02998

[51] Int. Cl.$^6$ ............................... C25C 1/00; C25B 1/00
[52] U.S. Cl. ........................... 205/43; 205/687; 205/723
[58] Field of Search ............................. 205/43, 687, 723

[56] References Cited

U.S. PATENT DOCUMENTS

| | | | |
|---|---|---|---|
| 3,743,696 | 7/1973 | Mason et al. | 423/10 |
| 4,318,893 | 3/1982 | Bathellier et al. | 423/10 |
| 4,686,019 | 8/1987 | Ryan et al. | 204/1.5 |

FOREIGN PATENT DOCUMENTS

| | | |
|---|---|---|
| 0010044 | 4/1980 | European Pat. Off. . |
| 0089185 | 9/1983 | European Pat. Off. . |

OTHER PUBLICATIONS

Chemical Abstracts, vol. 87, No. 20, 14 Nov. 1977, Columbus, Ohio, US; abstract No. 161012, Kosyakov, p. 603.
Gerard Koehly, "Sciences et Techniques Nucleaires", 1993, Commision Des Communautes Europeennes, Luxembourg, pp. 47–50 (no month).

*Primary Examiner*—Arun S. Phasge
*Attorney, Agent, or Firm*—Pearne, Gordon, McCoy & Granger

[57] ABSTRACT

The invention relates to a process for the electrochemical oxidation of Am(III) to Am(VI), usable for separating americium from spent nuclear fuel reprocessing solutions.

The process consists of adding to the aqueous nitric solution (17) containing the Am(III) a) heteropolyanion able to complex the americium, such as potassium phosphotungstate and b) the Ag(II) ion for oxidizing Am(III) being converted into Ag(I), and subjecting the solution to an electrolysis under conditions such that electrochemical regeneration takes place of the Ag(II) ion from the Ag(I) ion obtained during said oxidation.

After oxidizing Am(III) to Am(VI), it is possible to extract the latter in an appropriate organic solvent.

11 Claims, 3 Drawing Sheets

PROCESS FOR THE ELECTROCHEMICAL OXIDATION OF AM(III) TO AM(VI) USABLE FOR SEPARATING AMERICIUM FROM SPENT NUCLEAR FUEL REPROCESSING SOLUTIONS

DESCRIPTION

The present invention relates to a process for oxidizing Am(III) to Am(VI), more particularly for oxidizing the americium present in the trivalent state in aqueous solutions from the reprocessing of spent nuclear fuels, so as to be able to subsequently selectively extract it in an appropriate organic solvent.

In spent nuclear fuel reprocessing installations, during the first extraction stages, it is normal practice to obtain uranium and plutonium, as well as aqueous solutions of fission products containing relatively large quantities of trivalent ions of lanthanides and actinides. The aqueous effluents from these installations also contain the same ions.

In view of the long period of actinide elements, it is very important to separate all the trivalent actinides from the trivalent lanthanides, if it is wished to carry out an advanced reprocessing and eliminate the actinides from all the waste. Thus, the toxicity of the waste can be reduced by a factor of 100 on separating therefrom the minor actinides such as Np, Am and Cm and the long life fission products such as $^{99}$Tc, $^{135}$Cs and $^{129}$I.

In the case of americium and as described by J. M. ADNET et al, Global 93, 12–17Sep. 1993, Seattle, Wash., CEA-CONF-11652, it is possible to selectively separate it from nitric aqueous solutions by oxidizing to Am(VI), followed by an extraction using an appropriate organic solvent.

However, the selective separation of americium by such a process gives rise to certain problems for the performance of the first stage of oxidizing americium(III) in a nitric solution.

The oxidation of Am(III) to Am(VI) can be carried out chemically in low acidity solutions using a powerful chemical oxidant constituted by the silver-persulphate system. Thus, Schulz indicates in "The Chemistry of Americium", TIP-26971, p 53, that it is possible to chemically oxidize Am(II) into Am(VI) in a nitric solution with an acidity equal to or below 0.5M using the persulphate-Ag(I) system.

Milyukova et al in Radiokhimyia, 25 (6), 1983, pp 706–713 indicate that it is possible to oxidize Am(ll) to Am(VI) by the same silver-persulphate system, when the acidity of the solution is below 1M, by adding to the solution a complexing agent belonging to the family of lacunary heteropolyanions in a quantity such that the complexing agent/Am ratio is below 1.

Adnet et al in Global 93, 12–17 Sep. 1993, Seattle, Wash., CEA-CONF-11652, referred to hereinbefore, have demonstrated that it is possible to chemically oxidize Am(III) with this system in the presence of a heteropolyanion.

The chemical oxidation of americium cannot be envisaged in spent nuclear fuel reprocessing solutions, because the decomposition of the persulphate produces in solution sulphate ions incompatible with the subsequent treatment operations for the effluents and in particular vitrification.

Among other americium oxidation processes, an electrochemical oxidation process is known, which takes place in the presence of a complexing agent constituted by a heteropolyanion (HPA). This process is described by Kulyako et al in Radiokhimyia, vol. 23, No. 6, 1981, pp 837–843.

This oxidation process suffers from the disadvantage of only being performable with low acidity solutions using a complexing agent/americium molar ratio below 1. Moreover, this process only makes it possible to obtain 75% Am(VI) after seven hours of reaction.

Table 1 gives the known processes described hereinbefore, which do not offer satisfactory results or are not suitable in the case of spent nuclear fuel reprocessing solutions.

The present invention relates to a process for the electrochemical oxidation of Am(II) to Am(VI) making it possible to obtain 100% Am(VI) in less than one hour, starting from solutions having a nitric acid concentration above 1 mole/l, without requiring the use of a strong oxidant of the persulphate type and which is therefore suitable for the extraction of americium from aqueous solutions resulting from spent nuclear fuel reprocessing.

According to the invention, the process for the electrochemical oxidation of americium(III) into americium(VI) in an aqueous nitric solution consists of adding to the aqueous nitric solution containing the Am(II) a) a heteropolyanion able to complex the americium and b) the Ag(II) ion for oxidizing the Am(II) being converted into Ag(I) and subjecting the solution to an electrolysis under conditions such that electrochemical regeneration takes place of the Ag(II) ion from the Ag(I) ion obtained during said oxidation.

In this process, americium oxidation is obtained by the combined action of the heteropolyanion (HPA) and an electrically generated oxidant (redox pair Ag(II)/Ag(I)). Thus, the pair Ag(II)/Ag(I) with a high potential (1.93 V/ENH in a 4M HNO$_3$ medium) makes it possible on the one hand to impose on the solution a highly oxidizing potential and on the other to accelerate the electrochemical oxidation kinetics of Am(III) to Am(VI) according to the following procedure:

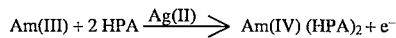

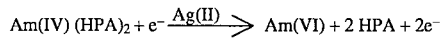

in which HPA represents the heteropolyanion.

For performing this process, it is possible to use a conventional electrolytic cell having separate anode and cathode compartments, whilst operating under intensiostatic or potentiostatic conditions.

The silver quantity added to the aqueous starting solution is chosen in such a way as to obtain at the maximum an [Ag]/[Am] concentration ratio of 10. Generally, use is made of quantities such that the total concentration of silver ions in the aqueous solution is $10^{-3}$ at $5.10^{-2}$ mole/l. The silver ion can be added in salt form and in particular in silver nitrate form.

The heteropolyanion added to the aqueous starting solution is chosen for its capacity to complex americium. As examples of such anions reference can be made to phosphotungstates, silicotungstates, germanotungstates, arseniotungstates and paratungstates. The latter are advantageously added in the form of alkali salts, e.g. potassium salts. Preference is given to the use of potassium phosphotungstate of formula $K_{10}P_2W_{17}O_{61}$, 15H$_2$O.

The added heteropolyanion quantity is chosen as a function of the americium quantity present in the aqueous solution to be treated and the quantities of metal ions other than americium present in said solution and which are liable to be complexed by said heteropolyanion. Preferably, the molar heteropolyanion/americium ratio is 0.1 to 2.5 and even more preferably 0.1 to 1, because the lower the said ratio the faster the oxidation kinetics of Am.

If other ions are present in the aqueous solution, the heteropolyanion content must be higher when said ions can be oxidized and complexed by the heteropolyanion (HPA) forming a stable complex.

Thus, when the aqueous solution contains other oxidizable trivalent metals M liable to form in oxidized form stable complexes with the heteropolyanion, it is necessary for the HPA quantity to be such that it represents an excess compared with the M-HPA complex.

Thus, if the stoichiometry of this complex is 1:1, the molar HPA/M ratio must exceed 1. This is the case when the aqueous solution contains cerium (III), which is oxidizable to Ce(IV) and forms a 1:1 stoichiometry complex with HPA.

The process of the invention offers numerous advantages, because it permits a rapid oxidation of Am(II) to Am(VI) in nitric solutions, which can have high nitric acid concentrations and which can e.g. vary in the range 1 to 6 mole/l, without producing sulphate ions.

To reveal the advantages of the process according to the invention, table 1 gives the results obtained with the invention in examples 5 and 7 given hereinafter. This table also gives for comparison purposes the results obtained by electrochemical oxidation in the absence of a heteropolyanion. Thus, it can be seen that only the process of the invention makes it possible to obtain a 100% oxidation in a very short time without using persulphate in solution.

The process according to the invention can in particular be used for separating the americium present in an aqueous nitric solution resulting from the reprocessing of spent nuclear fuels. In this case, after oxidizing Am(III) to Am(VI), selective extraction takes place of the Am(VI) in an organic phase containing an Am(VI) extractant.

In this extraction stage, use is made of an extractant able to extract americium(VI). Examples of such extractants are tributyl phosphate and dialkyl phosphoric acids, such as di(2,6-dimethyl,4-heptyl) phosphoric acid and di-2-ethylhexyl-phosphoric acid.

Generally the extractant is diluted in an appropriate organic solvent, e.g. dodecane. The extractant concentration of the organic phase can vary within a wide range and is in particular dependent on the solubilities of the extractant and the Am(VI) complex formed with said extractant in the solvent. It is generally 0.1 to 1 mole/l.

For this extraction, the aqueous phase containing the oxidized americium is contacted with an organic phase containing the extractant and the organic phase containing the extracted americium is then recovered. This contacting can take place in conventional extraction equipment, such as mixer-settlers, pulsed columns, etc.

BRIEF DESCRIPTION OF THE DRAWINGS

Other features and advantages of the invention can be gathered from the following description of non-limitative embodiments with reference to the attached drawings, wherein show:

FIG. 1 shows in vertical section an electrolytic cell usable for the electrochemical oxidation of americium according to the process of the invention. This cell comprises a double outer envelope 1 and 3 defining a space 2 for circulating a heat transfer fluid introduced by the inlet 5 and discharged via the outlet 7, to maintain the cell at an appropriate temperature. The cell comprises a cathode compartment 9, within which is located the cathode 11. This compartment is filled with a 4 mole/l nitric acid solution 12 and is sealed in its lower part by a glass frit 13. A cylindrical anode 15 is placed around the cathode compartment 9. The anode and cathode can be made from iridium platinum (10%).

Figure 1:
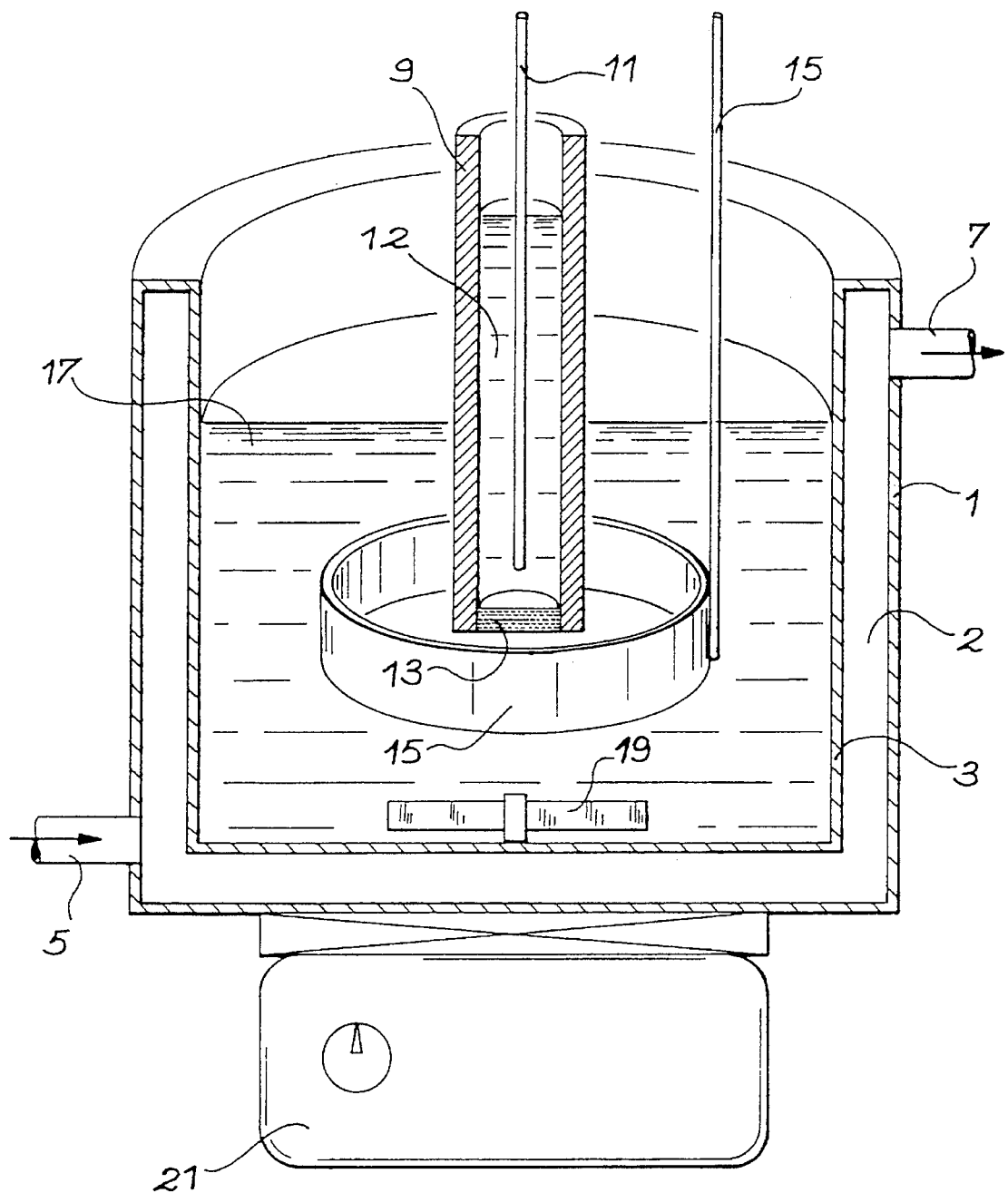
FIG. 1: A diagrammatic representation of an electrolytic cell usable in the process of the invention.

The aqueous solution 17 to be treated is introduced into the cell and can be stirred by means of a bar magnet 19 actuated by a magnetic stirrer 21.

EXAMPLE 1

In this example, electrochemical oxidation takes place of the Am(III) present in a 1 mole/l aqueous nitric solution, to which is added silver nitrate and potassium phosphotungstate (PW) of formula: $K_{10}P_2W_{17}O_{61}$, $15H_2O$. The starting, aqueous nitric solution has the following composition:

Am: $9.10^{-4}$ mole/l $HNO_3$: 1 mole/l $AgNO_3$: 0.01 mole/l

PW: $4.5.10^{-4}$ mole/l

PW/Am: 0.5

The temperature of the solution is stabilized to 25° C. and the solution then undergoes electrolysis imposing a constant anode intensity of 500 mA, the anode surface being 25 cm².

The evolution of the degree of oxidation of Am is followed by recording the absorption spectrum of the solution on the wavelength range 400 to 1100 nm. The disappearance of Am(II) is followed at 503 nm and the appearance of Am(VI) at 666 and 996 nm. Thus, the Am(VI) percentage is determined as a function of time, in minutes. The results obtained are given in FIG. 2 (curve 1). It can be seen that the Am(VI) percentage very rapidly reaches 100% (10 minutes).

EXAMPLES 2 to 4

These examples follow the operating procedure of example 1, but the added heteropolyanion quantities are such that the PW/Am ratio is 1 (example 2), 2.5 (example 3) and 5.25 (example 4).

Figure 2:
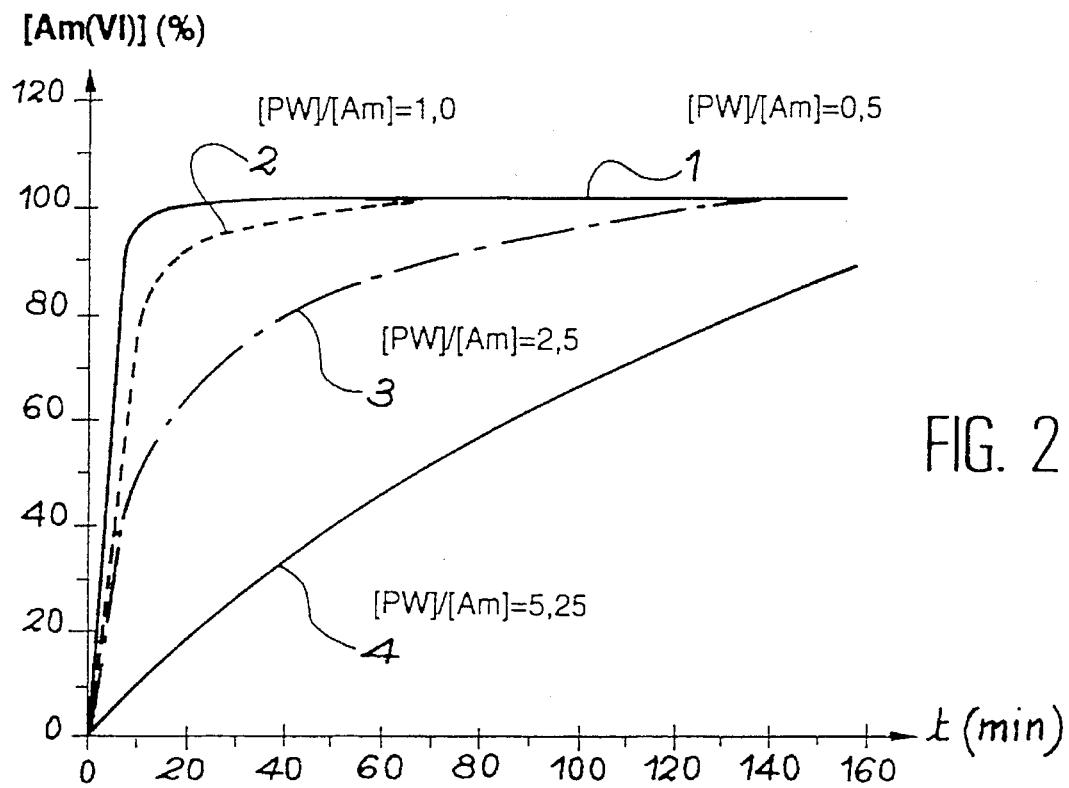
FIGS. 2 to 5: Graphs showing the Am(VI) percentage obtained by electrochemical oxidation of Am(II) as a function of the time, in minutes, for various performance conditions of the oxidation process according to the invention.

The results obtained under these conditions are respectively represented by curves 2 to 4 of FIG. 2.

Examination of these curves shows that the oxidation kinetics of Am(III) is slower when the PW/Am ratio increases.

EXAMPLES 5 to 7

These examples follow the operating procedure of example 1, but working takes place at a constant current intensity of 100 mA using an aqueous solution with a nitric acid concentration of 1 mole/l in example 5, 2 mole/l in example 6 and 3 mole/l in example 7.

Figure 3:
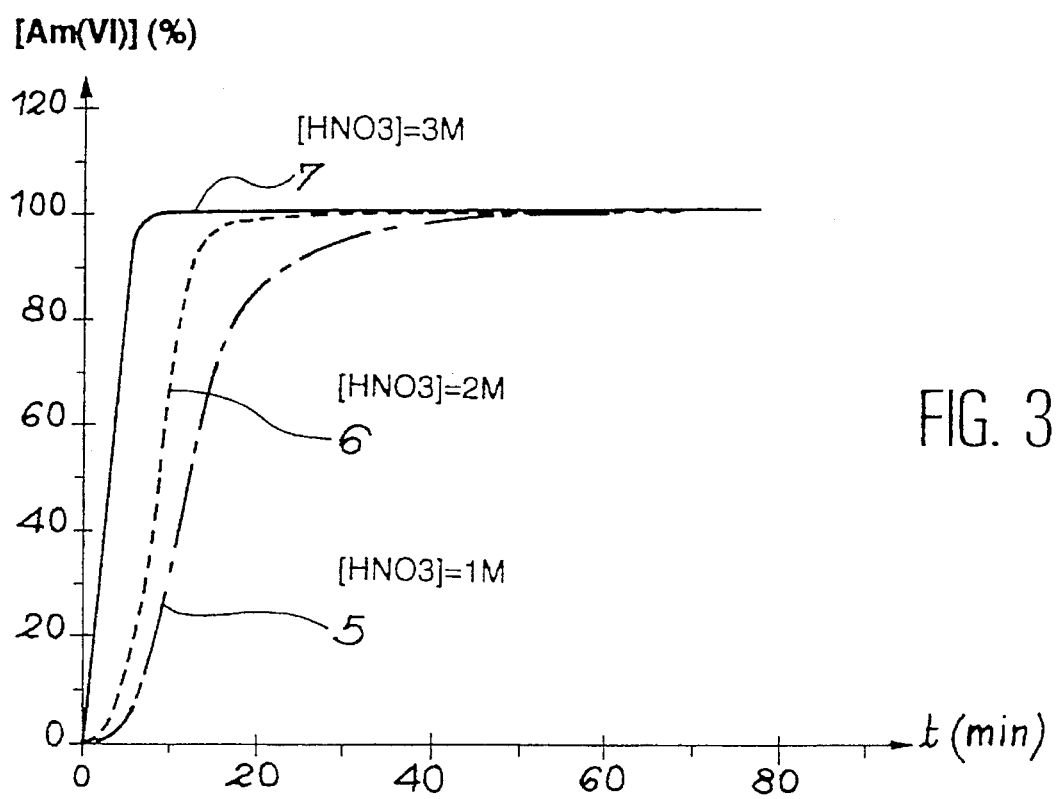

The results obtained with such solutions are represented by curves 5 to 7 in FIG. 3. Examination of these curves shows that the oxidation kinetics are slower when the nitric acid concentration decreases and that 100% oxidation is reached in less than 10 minutes with a nitric acid concentration of 3 mole/l, whereas in the prior art it was not possible to obtain an oxidation of Am(II) to Am(VI) in a nitric solution having a nitric acid concentration above 1 mole/l.

EXAMPLES 8 and 9

In these examples, electrochemical oxidation of Am takes place in an aqueous solution containing an excess of lanthanides such as Eu, which are not oxidizable and also cerium, which is oxidizable to Ce(IV) forming a stable 1:1 complex with PW.

For carrying this oxidation in example 8, the operating procedure of example 1 is followed, but using more PW to take account of the formation of the Ce(IV) PW complex.

The composition of the aqueous starting solution is as follows:

Am: $10^{-3}$ mole/l
$HNO_3$: 1 mole/l
Eu: 0.05 mole/l
Ag: 0.01 mole/l
PW: 0.0055 mole/l
Ce: 0.005 mole/l
PW/Ce=1.1

Electrochemical oxidation takes place under intensiostatic conditions at 25° to 30° C., with a current intensity of 100 mA and an anode surface of 25 cm².

Figure 4:
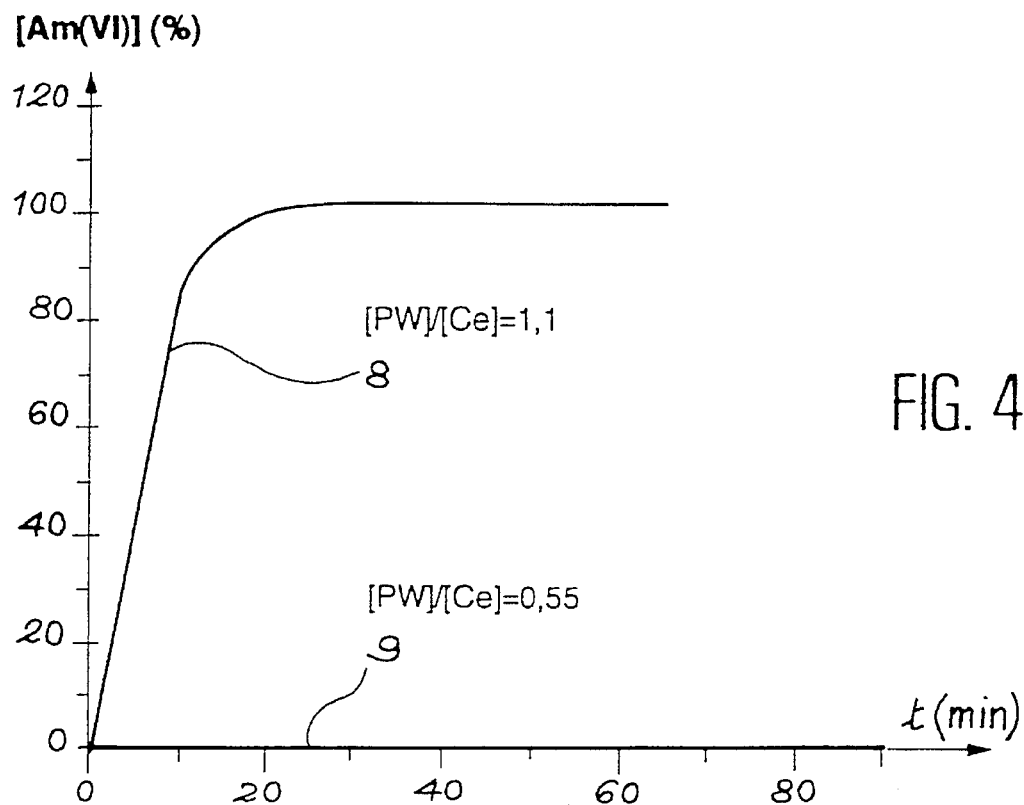

The results obtained are represented by curve 8 of FIG. 4. Thus, it is possible to see that the presence of europium does not modify the electrochemical oxidation of Am, because europium is not oxidizable. However, cerium is oxidizable to oxidation degree 4 and Ce(IV) forms a stable complex of 1:1 stoichiometry with the phosphotungstate.

However, as use has been made in this example of a phosphotungstate excess compared with the cerium quantity, it is possible to oxidize Am(II) to Am(VI), as in example 1.

Example 9 uses the same operating procedure, except that less phosphotungstate is used, because the PW/Ce ratio is 0.55. Under these conditions there is no oxidation of Am(II) to Am(VI), as is apparent from curve 9 in FIG. 4.

EXAMPLE 10

This example follows the operating procedure of examples 8 and 9, but the aqueous starting solution has the following composition:

Am: $10^{-3}$ mole/l
Eu: $5.10^{-2}$ mole/l
$HNO_3$: 1 mole/l
Ag: 0.01 mole/l
PW/Am: 0.5

Figure 5:
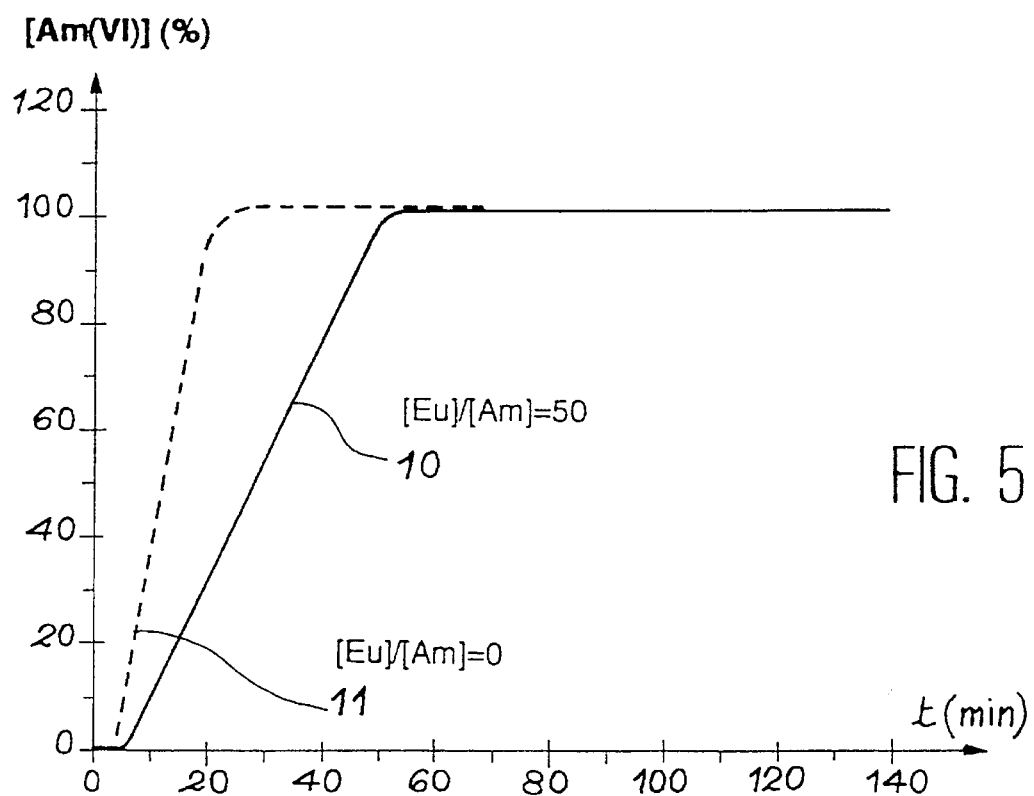

Electrolysis takes place under the same conditions as in example 1, the results obtained being represented by curve 10 in FIG. 5.

EXAMPLE 11

This example follows the operating procedure of example 10 starting with the same aqueous solution, except that the latter contains no europium. The results obtained are given in FIG. 5 (curve 11).

Thus, it can be seen that the mass of trivalent lanthanides has little influence on the americium oxidation kinetics, because in 60 minutes 100% Am(VI) are obtained, although the lanthanide:americium ratio is 50.

EXAMPLE 12

In this example, Am(III) is oxidized to Am(VI) in an aqueous solution simulating a solution obtained from a U and Pu coextraction cycle with the Purex process. This solution has the following composition:

Am: $10^{-3}$ mole/l
Mo: $6.56.10^{-3}$ mole/l
Zr: $6.3.10^{-3}$ mole/l
Ce: $3.2.10^{-3}$ mole/l
Eu: $10^{-2}$ mole/l
$HNO_3$: 4 mole/l To this solution is added silver nitrate in order to obtain a silver concentration of $10^{-2}$ mole/l and potassium phosphotungstate (PW) so as to obtain a PW concentration of $1.81 \cdot 10^{-2}$ mole/l.

Oxidation takes place at ambient temperature and under the same conditions as in example 7. After 40 minutes oxidation, there is a total conversion of Am(II) to Am(VI).

EXAMPLE 13

In this example recovery takes place of the americium present in form Am(VI), in the aqueous solution obtained after 1 hour of electrochemical oxidation under the conditions of example 11.

For this purpose, one volume of the aqueous solution containing Am(VI) is contacted with one volume of an organic phase constituted by dodecane containing 0.36 mole/l of di(2,6-dimethyl,4-heptyl)-phosphoric acid (HD(D-iBM)P). After stirring the two phases for one minute, the two phases are allowed to settle and the Am quantity in each phase is determined by measuring its x activity. From this is deduced the Am distribution coefficient (kDAm) given by the formula:

$$kDAm = \frac{A_{org} \alpha V_{aq}}{A_{aq} \alpha V_{org}}$$

in which $A_{org}$ is the x activity of the organic phase, $V_{org}$ the organic phase volume, $A_{aq}$ is the activity of the aqueous phase and $V_{aq}$ the volume of said aqueous phase.

The result obtained, as well as the americium percentage extracted are given in table 2.

EXAMPLES 14 and 15

These examples follow the operating procedure of example 13, but starting with aqueous solutions containing elements other than americium and having the compositions indicated in table 2.

Electrochemical oxidation is performed, followed by the extraction of the americium under the same conditions as in example 13, using an organic extractant concentration of 0.36 mole/l in example 14 and 0.5 mole/l in example 15.

The results obtained are also given in table 2. These results make it clear that in all cases there is an extraction of Am better than 80% after a single contact and the metallic species such as Ce(IV), Mo(VI) and Zr(IV), which form stable complexes with PW, are not extracted in the organic phase.

TABLE 1

| Oxidation type | HPA/Am molar ratio | Conditions | % Am(VI) | Authors |
|---|---|---|---|---|
| Ag(II) chemically generated by the action of persulphate in the presence of HPA [Am] = 0.97 × 10$^{-3}$ mole/l | 0.66 | [HNO$_3$] = 1 mole/l [Ag] = 8.9 × 10$^{-3}$ mole/l [K$_2$S$_2$O$_8$] = 8.9 × 10$^{-2}$ mole/l | 90% in 30 min. | Adnet et al |
| Ag(II) chemically generated by the action of persulphate in the presence of HPA [Am] = 10$^{-3}$ mole/l | 0.4 | [HNO$_3$] = 1 mole/l [Ag] = 3 × 3$^{-3}$ mole/l [K$_2$S$_2$O$_8$] = 0.2 mole/l | 80% in 150 min. 100% in 240 min. | Milyukowa et al |
| Electrochemical oxidation in the absence of silver and in the presence of HPA [Am] = 7.8 × 10$^{-4}$ mole/l | 0.26 | [HClO$_4$] = 0.01 mole/l [Ag] = 0 Oxidation at imposed potential E = 1.77 V/ENH | 75% Am(VI) in 7 h | Kulyako et al |
| Ag(II) electrically generated without HPA [Am] = 10$^{-3}$ mole/l | 0 | [HNO$_3$] = 1 mole/l [Ag] = 0.01 mole/l; i = 100 mA anode surface = 25 cm$^2$ | no Am(VI) in 100 min. | this work |
| Ag(II) electrically generated in the presence of HPA [Am] = 9.10$^{-4}$ mole/l | 0.5 | [HNO$_3$] = 1 mole/l [Ag] = 0.01 mole/l; i = 100 mA anode surface = 25 cm$^2$ | 100% in 40 min. | Invention Example 5 |
| | | [HNO$_3$] = 3 mole/l [Ag] = 0.01 mole/l; i = 100 mA anode surface = 25 cm$^2$ | 100% in 10 min. | Invention Example 7 |

TABLE 2

| EX | Aqueous phase | Vorg/Vaq | [HD(DiBM)P] in dodecane | kD Am | % Am extracted | Comments |
|---|---|---|---|---|---|---|
| 13 | [NO$_3$] = 1 mole/l [Am] = 10$^{-3}$ mole/l [PW]/[Am] = 0.5 [Ag] = 10$^{-2}$ mole/l | 1 | 0.36 mole/l | 7.8 | 89 | |
| 14 | [HNO$_3$] = 1 mole/l [Am] = 10$^{-3}$ mole/l [Eu] = 5 × 10$^{-2}$ mole/l [Ce] = 5 × 10$^{-3}$ mole/l [PW]/[Ce] = 1.1 [Ag] = 10$^{-2}$ mole/l | 1 | 0.36 mole/l | 7.8 | 89 | Extraction performed on solution of example 8, Ce(IV) complexed by PW is not extracted |
| 15 | [HNO$_3$] = 4 mole/l [Am] = 10$^3$ mole/l [PW] = 1.81 × 10$^{-2}$ mole/l [Mo] = 6.56 × 10$^{-3}$ mole/l [Zr] = 6.3 × 10$^{-3}$ mole/l [Ce] = 3.2 × 10$^{-3}$ mole/l [Eu] = 10$^{-2}$ mole/l [Ag] = 10$^{-2}$ mole/l | 1 | 0.5 mole/l | 5.25 | 85 | Solution of example 12 |

We claim:

1. Process for the electrochemical oxidation of americium(III) to americium(VI) in an aqueous nitric solution, comprising the steps of adding to the aqueous nitric solution containing Am(III) a) a heteropolyanion that complexes the americium and b) an Ag(II)ion which is converted into Ag(I) during the oxidation of the Am(III), and subjecting the solution to electrolysis under conditions wherein the Ag(I) ion obtained during said oxidation is electrochemically regenerated to the Ag(II) ion.

2. Process according to claim 1, comprising the total concentration of silver ions in the aqueous solution is 10$^{-3}$ at 5.10$^{-2}$ mole/l.

3. Process according to claim 1, comprising the heteropolyanion is a phosphotungstate, a silicotungstate, a germanotungstate, an arseniotungstate or a paratungstate.

4. Process according to claim 3, comprising the heteropolyanion is potassium phosphotungstate of formula: K$_{10}$P$_2$W$_{17}$O$_{61}$, 15H$_2$O.

5. Process according to claim 1, comprising the heteropolyanion:americium molar ratio is 0.1 to 2.5.

6. Process according to claim 1, comprising the nitric acid concentration of the aqueous solution is 1 to 6 mole/l.

7. Process according to claim 1, comprising the aqueous solution contains other oxidizable, trivalent metals M which form, in oxidized form, stable complexes with the heteropolyanion (HPA), and in that the added HPA quantity is such that the molar HPA:M ratio exceeds the stoichiometry of the HPA-M complex.

8. Process according to claim 7, comprising the oxidizable metal is cerium and that the HPA:Ce ratio exceeds 1.

9. Process according to claim 1, comprising the aqueous solution is a spent nuclear fuel reprocessing solution.

10. Process for separating the americium present in an aqueous nitric solution resulting from the reprocessing of spent nuclear fuels, comprising the following steps:

a) electrochemically oxidizing the americium(III) of the solution into americium(VI), whilst adding to the aqueous nitric solution containing the Am(III) i) a heteropolyanion that complexes the americium and ii) an Ag(II) ion which is converted into Ag(I) during the oxidation of Am(III), and subjecting the solution to electrolysis under conditions wherein the Ag(I) ion obtained during said oxidation is electrochemically regenerated to the Ag(II) ion and b) selectively extracting the americium(VI) in an organic phase containing an Am(VI) extractant.

11. Process according to claim 10, comprising the extractant is di(2,6-dimethyl,4-heptyl)-phosphoric acid.

* * * * *